(12) United States Patent
Zhang et al.

(10) Patent No.: US 7,485,070 B2
(45) Date of Patent: Feb. 3, 2009

(54) ANTI-BACKLASH PLANETARY GEARING FOR OPTIC ROTARY JOINT

(76) Inventors: Hong Zhang, 5 Wayne CT, Plainsboro, NJ (US) 08536; Boying B. Zhang, 10 Stonicker Dr., Lawrenceville, NJ (US) 08648

( * ) Notice: Subject to any disclaimer, the term of this patent is extended or adjusted under 35 U.S.C. 154(b) by 186 days.

(21) Appl. No.: 11/357,451

(22) Filed: Feb. 3, 2006

(65) Prior Publication Data

US 2007/0184934 A1   Aug. 9, 2007

(51) Int. Cl.
*F16H 57/08* (2006.01)
(52) U.S. Cl. .................................. 475/338; 475/347
(58) Field of Classification Search ................ 475/338, 475/339, 340, 341, 342, 345, 346, 347, 348, 475/902
See application file for complete search history.

(56) References Cited

U.S. PATENT DOCUMENTS

| | | | | |
|---|---|---|---|---|
| 2,759,376 | A | * | 8/1956 | Chamberlin et al. ........ 475/338 |
| 3,245,279 | A | * | 4/1966 | Baker .......................... 74/410 |
| 5,442,721 | A | * | 8/1995 | Ames ........................... 385/26 |
| 2003/0139250 | A1 | * | 7/2003 | Bowman .................... 475/338 |
| 2005/0014594 | A1 | * | 1/2005 | Degen et al. ................ 475/163 |

* cited by examiner

*Primary Examiner*—Sherry L Estremsky
*Assistant Examiner*—Edwin A Young

(57) ABSTRACT

The invention includes a precision planetary gear system which requires 2:1 gear ratio. The planetary gear system consists of three, or more planet gear assemblies. By adding a local degree of freedom, the planet gear assembly could be tilted relative to the carrier by a spring-loaded annular ring through a spherical feature thus force the three, or more planet gear assemblies symmetrically mesh into the sun gear and internal gear. A couple of elastomeric sleeves are introduced into the connection between the planet housing and the carrier so as to balance the load evenly among the three planet assemblies and to reduce the speed fluctuation of transmitted motion as well as the noise and vibration.

3 Claims, 3 Drawing Sheets

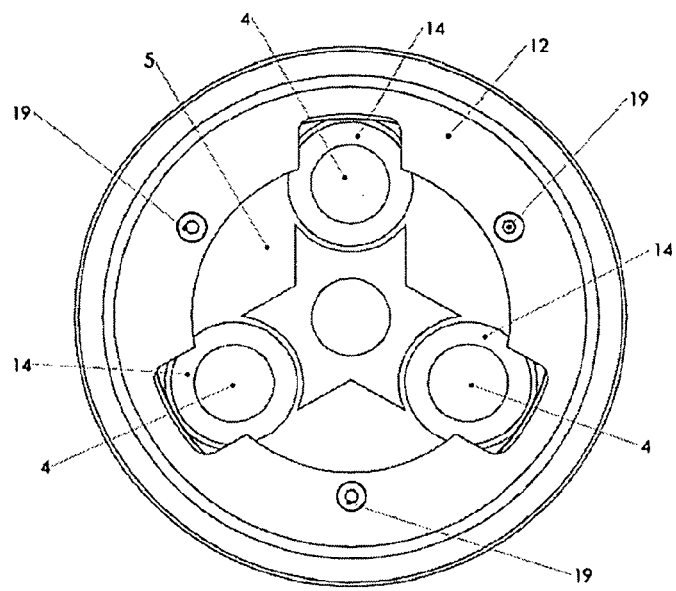
Fig. 3
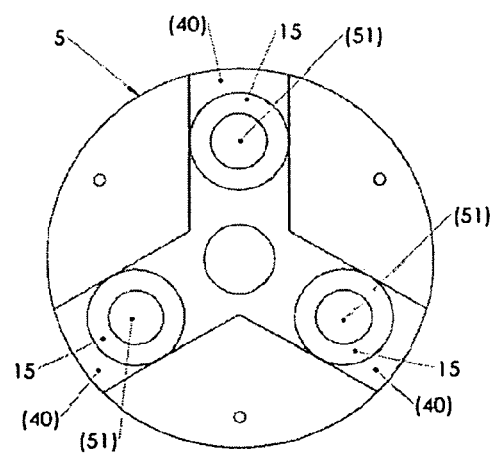 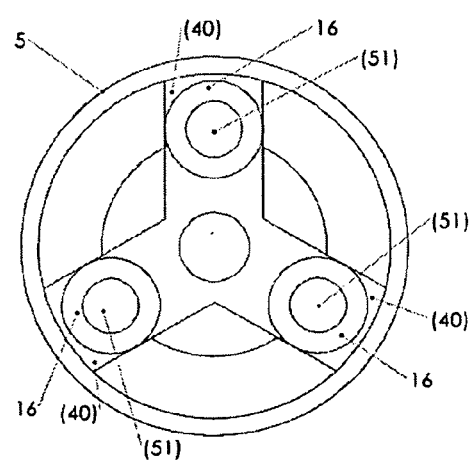
Fig. 4A             Fig. 4B

ANTI-BACKLASH PLANETARY GEARING FOR OPTIC ROTARY JOINT

BACKGROUND OF THE INVENTION

1. Field of the Invention

The invention is related to epicyclic gear trains, and in particular to anti-backlash mechanism of precision planetary gear systems for the application of multi-channel fiber optical rotary joint in telecommunication industry.

2. Description of Related Art

In a gear transmission system, when two gears mesh each other, there is usually a clearance, or backlash between the teeth of two gears due to manufacturing errors and assembly errors. At a reversal transmission, the direction of rotation changes and the output shaft of gear transmission system would turn a slight angle due to the above named clearance, or backlash. That would cause a motion loss, or kinematic transmission error and dynamically also cause noise and vibration.

Precision planetary gear systems has a unique application in multi-channel fiber optical rotary joint. U.S. Pat. No. 5,442,721 illustrates one such rotary joint which includes a stationary bundle of fiber optical collimators and a rotational bundle of fiber optical collimators. The light beams from rotational bundle of fiber optical collimators are passed through a de-rotating prism and directed onto individual collimators of stationary bundle. In such an application, the kinematic requirement is that the rotational bundle of fiber optical collimators should rotate at twice the speed of rotation of the prism coaxially. To reduce the optical loss and variation of loss with rotation, the kinematic transmission accuracy should be less than 4 to 8 arc minutes.

U.S. Pat. No. 4,189,951 discloses an anti-backlash twin gear with a spring bias for rotating the gears relative to each other about a common axis. When the twin gear is intermeshed with a driving pinion engaging both half gears thereof, the springs are then tensioned to cause the half-gears to exert pressure on opposite tooth flanks of the pinion, thereby avoiding lost motion. The disadvantages of the anti-backlash twin gear are that the diameter of the twin gear need to be large enough for installing the spring bias apparatus and an open space should be big enough for assembly of further gears.

A more sophisticated approach can be found in U.S. Pat. No. 4,072,064. Here, the anti-backlash gear assembly includes a hydraulic piston that automatically maintains clearance filling positioning of two circumferentially and axially adjustable segments of a split gear. However, this device is complicated and expensive when compared to simple spring biasing system.

SUMMARY OF THE INVENTION

The first object of the present invention is to provide an anti-backlash apparatus in a planetary gear train for multi-channel fiber optic rotary joints.

Another object of the present invention is to increase the accuracy of kinematic transmission and to reduce noise and vibration in a planetary gear train.

A further object of the preset invention is to provide a very low-profile and compact design of a planetary gear train with 2:1 gear ratio for multi-channel fiber optic rotary joints.

BRIEF DESCRIPTION OF THE DRAWINGS

FIG. 3 is a side view of the anti-backlash apparatus.

FIGS. 4A and 4B are side views of the load balancing mechanism in the invention.

DETAILED DESCRIPTION OF THE INVENTION

Figure 1:
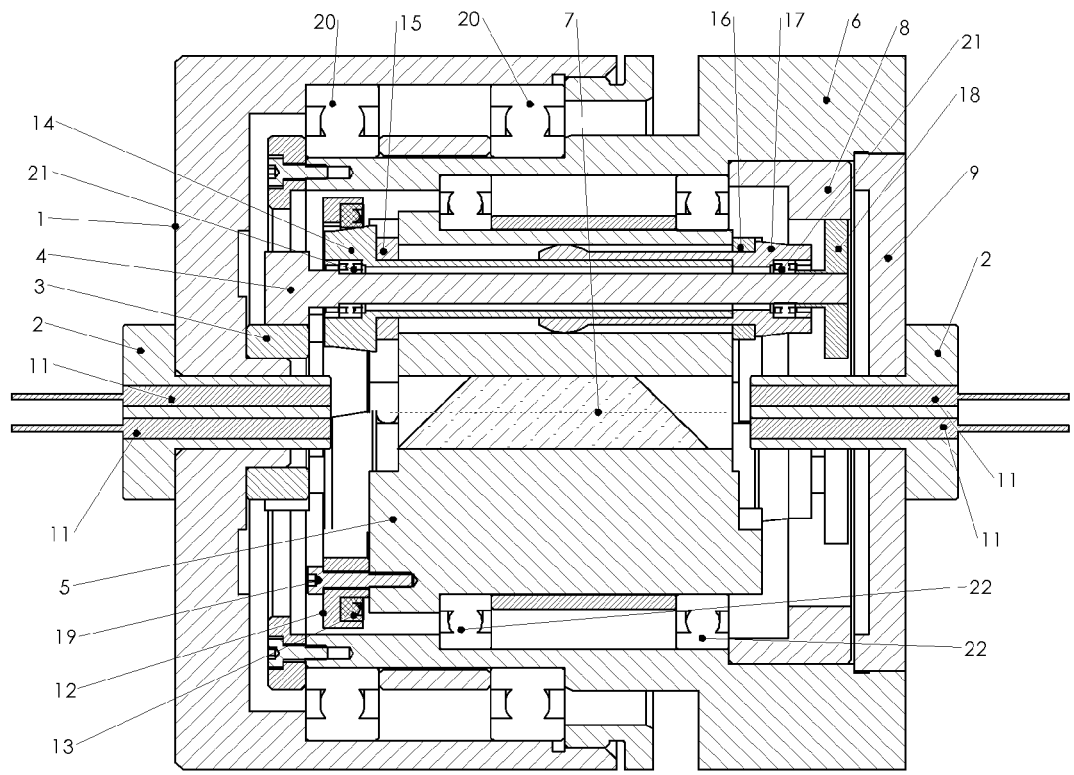
FIG. 1 is a cross section view of one embodiment of the invention.

As shown in FIG. 1, a typical design of a multi-channel fiber optical rotary joint comprises rotor 1, fiber bundles 2, stator 6, Dove prism 7 and prism holder 5. The stationary fiber bundles 2 is mounted along the axis of stator 6 through threaded plate 9. While the rotational fiber bundles 2 is fixed in the central hole of rotor 1. When the rotor 1 rotates, the prism holder 5 should also rotates at half the speed of rotor 1 and in the same rotational direction to ensure the light beam from the collimator 11 of the rotational bundle are transmitted onto the correspondent collimator 11 of the stationary bundle. Vise versa. The 2:1 gear ratio is realized by the planetary gear system which includes sun gear 3, first planet gear 4 (3 pieces), second planet gear 18 (3 pieces), internal gear 8 and carrier 5 (also called prism holder). The first planet gear 4 is coaxially fixed with the second planet gear 18.

Kinematic joints, i.e., three revolute pairs are constituted through a pair of bearings 20, a pair of bearings 21 and a pair of bearings 22 between rotor 1 and stator 6, planet gears 4 (with planet gear 18) and carrier 5, carrier 5 and stator 6. As shown FIG. 2, two gear pairs are formed between sun gear 3 and planet gear 4, as well as planet gear 18 and internal gear 8. Based on Gruebler's equation, the degree of freedom for the said planetary gear system is one.

In FIGS. 4A & 4B, the carrier, or prism holder 5 has three symmetrically placed through bores (51). Correspondingly, three slots (40) are symmetrically designed on the two side plan of carrier 5.

Figure 5:
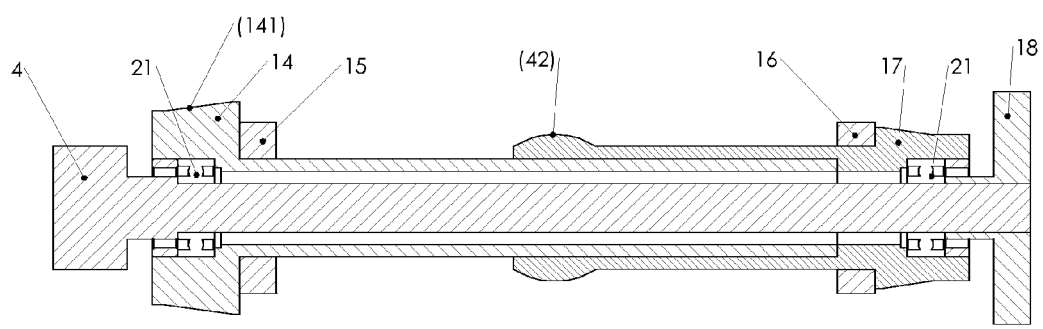
FIG. 5 shows the planet gear assembly.

FIG. 5 illustrates the planet gear assembly which includes planet gear 4, second planet gear 18, planet housing 14 and 17, a pair of bearing 21, elastomeric sleeves 15 and 16. In the present invention, planet housing 14 and 17 are coaxially fixed together. On planet gear housing 17, a feature (42) is deliberately designed as a spherical shape which is loose fitted in the bore (51) of carrier 5. When a force is applied on the tapered feature (141) of planet housing 14, relative to carrier 5, the whole planet gear assembly will tilt around the spherical feature (42).

Figure 2:
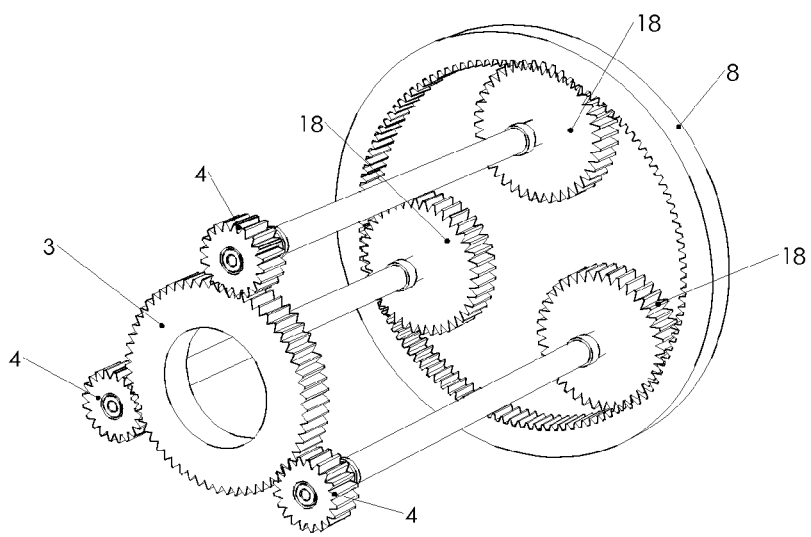
FIG. 2 is a 3 D model of the planetary gear system in the invention.

In a preferred embodiment, 3 or more said planet assemblies are symmetrically arranged encircling the sun gear and internal gear. A spring-loaded elastomeric annular ring 13 is tightly placed on the tapered feature (141) of planet housing 14 and is centered with carrier 5. The annular ring 13 is seated in the annular slot of steel holder 12 (FIG. 1 and FIG. 3), and is connected with carrier 5 through three screw 19 (FIG. 3) so that a force is applied on the tapered feature (141) of planet housing 14. As shown in FIG. 2, the three planet gear 4 are symmetrically meshed with sun gear 3 and are hold tightly against the sun gear by the spring-loaded elastomeric annular ring 13. At the same time, the three planet assemblies are tilted so that the three second planet gear 18 are forced to tightly mesh with the internal gear 8. The backlashes between the meshed teeth are eliminated due to the applied force from elastomeric annular ring 13. By adjusting the screw 19, the applied force from elastomeric annular ring 13 can be changed.

As shown in FIG. 1~5, the elastomeric sleeves 15 and 16 are mounted on the shaft of planet gear housing 14 and 17 respectively, and fitted within the slots (40) of carrier 5. The function of the three pairs of elastomeric sleeves 15 and 16 are to balance the load evenly among the three planet assemblies and to reduce the speed fluctuation of transmitted motion as well as noise and vibration.

The invention claimed is:

1. A anti-backlash planetary gear system for a multi-channel fiber optic rotary joint comprising:
   a sun gear;
   three, or more planet gear assemblies;
   an internal gear;
   a carrier;
   an elastic annular ring symmetrically arranged encircling said sun gear and said planet gear assemblies;
   a steel holder with an annular slot on one side face to hold said elastic annular;
   each said planet gear assembly includes a first planet gear, a second planet gear, a pair of planet gear housings, a pair of bearings;
   each said first planet gear meshing with said sun gear;
   each said second planet gear meshing with said internal gear;
   each said first planet gear fixed with each said second planet gear coaxially;
   each said first planet gear and second planet gear being rotational coaxially relative to said planet gear housings;
   said internal gear being stationary;
   said sun gear being rotational coaxially relative to said internal gear through a pair of bearings; and
   said carrier being rotational coaxially relative to said internal gear through a pair of bearings.

2. The planetary gear system according to claim 1, wherein said carrier has three symmetrically placed through bores around its central axis and carrier said planet gear housing has a spherically shaped feature which is loose fitted in one of said bore respectively.

3. The planet gear assembly according to claim 1, wherein said one of the planet gear housing has a tapered feature on the end of said planet gear assembly and said elastic annular ring is tightly embraced over said tapered features by said steel holder through a couple of screws on said carrier.

* * * * *